United States Patent
Morita et al.

[11] Patent Number: 6,060,697
[45] Date of Patent: May 9, 2000

[54] SUBSTRATE PROCESSING APPARATUS HAVING REGULATED POWER CONSUMPTION AND METHOD THEREFOR

[75] Inventors: Akihiko Morita; Masami Ohtani; Yasuo Imanishi; Masao Tsuji; Masaki Iwami; Joichi Nishimura; Kazuhiro Nishimura; Tetsuya Hamada; Satoshi Yamamoto; Kenji Kamei, all of Kyoto, Japan

[73] Assignee: Dainippon Screen Mfg. Co., Ltd., Japan

[21] Appl. No.: 09/039,141

[22] Filed: Mar. 13, 1998

[30] Foreign Application Priority Data

Mar. 17, 1997 [JP] Japan .................................. 9-063362
Oct. 6, 1997 [JP] Japan .................................. 9-273060

[51] Int. Cl.[7] .................................................. H05B 1/02
[52] U.S. Cl. ........................... 219/483; 219/485; 219/501; 219/497; 307/38; 392/416
[58] Field of Search ................................ 219/483–486, 219/497, 501, 505, 494; 392/416; 307/38–41

[56] References Cited

U.S. PATENT DOCUMENTS

| 4,180,721 | 12/1979 | Watanabe et al. | 219/216 |
| 4,282,422 | 8/1981 | Payne et al. | 219/486 |
| 4,920,252 | 4/1990 | Yoshino | 219/485 |
| 5,021,637 | 6/1991 | Perala et al. | 219/485 |
| 5,359,178 | 10/1994 | Kotani et al. | 219/486 |
| 5,528,016 | 6/1996 | Mogi | 219/486 |

*Primary Examiner*—Mark Paschall
*Attorney, Agent, or Firm*—Ostrolenk, Faber, Gerb & Soffen, LLP

[57] ABSTRACT

A substrate processing apparatus reduces an instantaneous maximum power consumption at turn-on. Power receiving parts of a plurality of processing units are connected to one end of a turn-on switch respectively through switches. The other end of the turn-on switch is connected to an external power source through a breaker. Timer values are set in advance in the timers, respectively. When the turn-on switch is turned on, the timers turn on the associated switches respectively after times which are defined by the timer values, whereby the processing units are provided with electric power, each with a delay of a constant time.

11 Claims, 9 Drawing Sheets

SUBSTRATE PROCESSING APPARATUS HAVING REGULATED POWER CONSUMPTION AND METHOD THEREFOR

BACKGROUND OF THE INVENTION

1. Field of the Invention

The present invention relates to a substrate processing apparatus which comprises a plurality of processing portions.

2. Description of the Background Art

A substrate processing apparatus is used to apply various types of processing to a substrate such as a semiconductor wafer, a glass substrate for liquid crystal display, a glass substrate for photomask and a glass substrate for optical disk. During processes for manufacturing of a semiconductor device, for example, to enhance the efficiency of the production, a substrate processing apparatus is used which integrates a plurality of processing units each performs each type of a series of processing. In general, such a substrate processing apparatus is connected to power supply equipment (external power source), so that electric power which is supplied from the power supply equipment drives the plurality of processing units.

Figure 9:
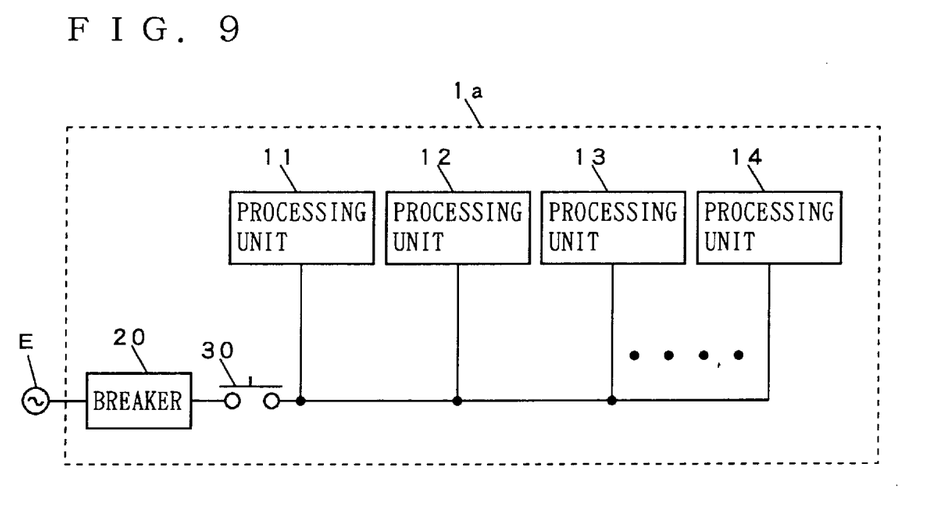
FIG. 9 is a block diagram showing an electric power system in a conventional substrate processing apparatus.

FIG. 9 is a block diagram showing an electric power system in a conventional substrate processing apparatus. In FIG. 9, a substrate processing apparatus 1a comprises a plurality of processing units 11, 12, 13 and 14 each for applying predetermined processing to a substrate. Power receiving parts of the plurality of processing units 11, 12, 13 and 14 are connected to an external power source E through a turn-on switch 30 and a breaker 20. As the turn-on switch 30 is turned on, electric power from the external power source E is supplied to the plurality of processing units 11, 12, 13 and 14.

Resistor elements such as a filament of a lamp and a nichrome wire of a heater are used in the respective processing units 11, 12, 13 and 14. When such a resistor element carries a current, although a large amount of heat is developed, the lower the temperature of the resistor element is, the smaller an electric resistance of the resistor element is. At turn-on, the temperature of the resistor element is low. The temperature increases with time, and stabilizes at a certain temperature. Hence, immediately after turn-on, a larger current flows than in a steady state.

Figure 10:
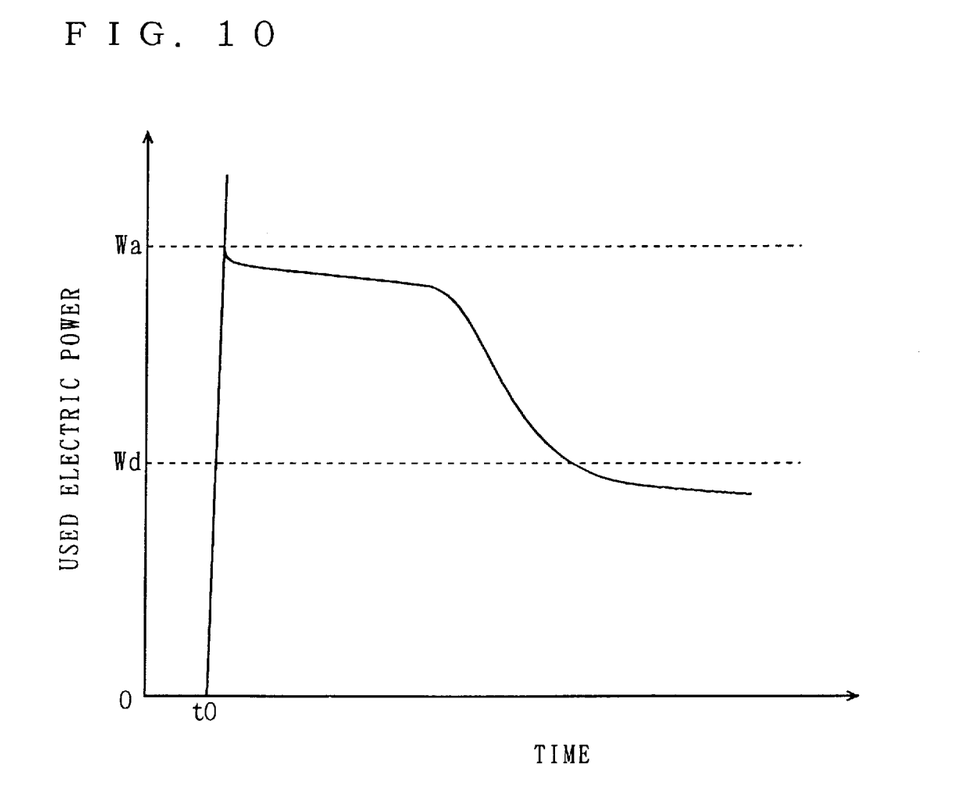
FIG. 10 is a view showing a change with time in electric power which is used by the substrate processing apparatus of FIG. 9 as a whole.

FIG. 10 is a view showing a change with time in electric power which is used by the substrate processing apparatus 1a of FIG. 9. Since electric power is supplied simultaneously to the plurality of processing units 11, 12, 13 and 14 upon turn-on in the substrate processing apparatus 1a of FIG. 9, due to the electric behavior described above of each one of the processing units 11, 12, 13 and 14, as shown in FIG. 10, used electric power which is used by the substrate processing apparatus 1a as a whole is large during a certain period of time from a turn-on time t0, but drops lower than a certain constant level Wd once the substrate processing apparatus 1a enters a steady state. In this case, it is necessary to set a working level Wa of the breaker 20 larger than the used electric power of immediately after turn-on, so that a power supplying capability of the external power source E is larger than the working level Wa of the breaker 20.

However, to increase the power supplying capability of the external power source E is not preferable for safety, and also requires a large scale of facilities and leads to an increase in a maintenance cost. This forces a great burden on a user of the substrate processing apparatus 1a.

Further, in a substrate processing apparatus which comprises a plurality of heating units (hot plates) among processing units, a temperature adjusting controller is disposed which adjusts a processing temperature within each heating unit. The heating units each comprise a substrate supporting plate for supporting a substrate and a heater for heating the substrate supporting plate. Processing temperatures for the respective heating units are set as target temperatures in the temperature adjusting controller.

At turn-on, the temperature adjusting controller supplies electric power from an external power source to the heaters of the respective heating units and heats the substrate supporting plates. Once the temperature of the substrate supporting plate of each heating unit reaches a target temperature, in order to keep the temperature of the substrate supporting plate at the target temperature, the temperature adjusting controller ON/OFF controls a current which is supplied to the heater of the heating unit.

Hence, used electric power which is by the substrate processing apparatus 1a as a whole is high during a period of time from turn-on until adjustment of the temperatures of the respective heating units completes, and the used electric power is low during heat retaining after the adjustment of the temperatures of the respective heating units completes In addition, when a recipe (i.e., procedures) is changed in response to a change in a lot which contains a substrate which is to be processed, the target temperatures for the respective heating units which are set in the temperature adjusting controller are also changed.

In this case, the temperature adjusting controller supplies the electric power from the external power source to the heaters of the respective heating units until the temperatures of the substrate supporting plates of the respective heating units reach the changed target temperatures. After the adjustment of the temperatures of the respective heating units completes, to keep the temperatures of the substrate supporting plates of the respective heating units at the target temperatures, the temperature adjusting controller ON/OFF controls the current which is supplied to the heaters of the respective heating units.

Hence, used electric power which is used by the substrate processing apparatus 1a as a whole is high during the adjustment of the temperatures of the respective heating units after the target temperatures are changed, and the used electric power is low during heat retaining after the adjustment of the temperatures of the respective heating units completes.

In this case, during the period of time from turn-on until the adjustment of the temperatures of the respective heating units completes and during the period from the change in the target temperatures until the adjustment of the temperatures of the respective heating units completes, the external power source is demanded to have a power supplying capability which is larger than the electric power used after the adjustment of the temperatures, and wire material parts of the electric power system are demanded to have capacities which correspond to the used electric power. This makes energy conservation and cost reduction difficult.

SUMMARY OF THE INVENTION

The present invention is directed to an apparatus for processing a substrate.

An apparatus for processing a substrate according to the present invention comprises: a) a plurality of processing portions each for applying predetermined processing to a substrate; b) turn-on means which is connected to an external power source which is disposed outside the apparatus; and c) power supply controlling means for providing each one of the plurality of processing portions with electric power which is supplied from the external power source through the turn-on means, wherein at turn-on by the turn-on means, the power supply controlling means sequentially provides the plurality of processing portions with the electric power with time intervals.

In the substrate processing apparatus according to the present invention, the electric power which is supplied from the external power source at the turn-on is supplied to the plurality of processing portions at the different times, and therefore, initial consumptions of electric power at the plurality of processing units occur at different times. This reduces an instantaneous maximum power which is consumed by the substrate processing apparatus as a whole immediately after the turn-on. Hence, it is possible to reduce a power supplying capability of the external power source.

In a preferred embodiment of the present invention, the power supply controlling means comprises: c-1) a plurality of switch means each connected between the turn-on means and each one of the plurality of processing portions; and c-2) timing means for turning on the plurality of switch means at different times which are set in advance after the turn-on by the turn-on means.

In this case, since the plurality of switch means are sequentially turned on at the different times which are set in advance after the turn-on, initial consumptions of electric power at the plurality of processing units occur at different times, which reduces an instantaneous maximum power which is consumed by the substrate processing apparatus as a whole immediately after the turn-on.

In other preferred embodiment of the present invention, the power supply controlling means comprises: c-3) a plurality of switch means each connected between the turn-on means and each one of the plurality of processing portions; c-4) power measuring means for measuring total electric power which is being used at the plurality of processing portions; and c-5) switch controlling means for sequentially turning on the plurality of switch means in accordance with a measurement which is obtained by the power measuring means.

In this case, since the plurality of switch means are sequentially turned on in accordance with the measurement which is obtained by the power measuring means, an instantaneous maximum power which is consumed by the substrate processing apparatus as a whole immediately after the turn-on can be maintained at a certain level or lower.

In a still preferred embodiment of the present invention, an apparatus for processing a substrate comprises: a) a plurality of processing portions each comprising a heat source and each applying heat processing to a substrate; b) power supplying means which is connected to an external power source which is disposed outside the apparatus, the power supplying means providing each one of the plurality of processing portions with electric power which is supplied from the external power source; and c) power supply controlling means for controlling the power supplying means and thereby adjusting supply of the electric power to each one of the plurality of processing portions so that each one of the plurality of processing portions reaches a predetermined temperature, wherein the power supply controlling means controls the power supplying means at turn-on, in such a manner that the electric power from the external power source is sequentially supplied to each one of the plurality of processing portions with time intervals.

In the substrate processing apparatus according to the still preferred embodiment of the present invention, since the electric power which is supplied from the external power source at the turn-on is supplied to the plurality of processing portions at the different times, and therefore, consumptions of electric power which are needed at the plurality of processing units for the adjustment of temperatures occur at different times. This reduces an instantaneous maximum power which is consumed by the substrate processing apparatus as a whole immediately after the turn-on.

Hence, it is possible to reduce a power supplying capability of the external power source, while reducing capacities of wire material parts of an electric power system. This makes energy conservation and cost reduction possible.

In other preferred embodiment of the present invention, an apparatus for processing a substrate comprises: a) a plurality of processing portions each comprising a heat source and each applying heat processing to a substrate; b) power supplying means which is connected to an external power source which is disposed outside the apparatus, the power supplying means providing each one of the plurality of processing portions with electric power which is supplied from the external power source; and c) power supply controlling means for controlling the power supplying means and thereby adjusting supply of the electric power to each one of the plurality of processing portions so that each one of the plurality of processing portions reach predetermined target temperatures, wherein the power supply controlling means controls the power supplying means when the target temperatures are changed, in such a manner that the electric power from the external power source is sequentially supplied to each one of the plurality of processing portions with time intervals in accordance with changed target temperatures which are changed for the plurality of processing portions.

In the substrate processing apparatus according to this preferred embodiment of the present invention, when the target temperatures for the plurality of processing portions are changed, supply of the electric power to the respective processing portions by the power supplying means is controlled at the different times, and therefore, consumptions of electric power which are needed at the plurality of processing units for the adjustment of temperatures occur at different times. This reduces an instantaneous maximum power which is consumed by the substrate processing apparatus as a whole immediately after the target temperatures are changed.

Hence, it is possible to reduce a power supplying capability of the external power source, while reducing capacities of wire material parts of an electric power system. This makes energy conservation and cost reduction possible.

The present invention is also directed to a method of processing a substrate.

Accordingly, an object of the present invention is to provide a substrate processing apparatus which realizes a reduction in an instantaneous maximum power consumption at turn-on.

Other object of the present invention is to provide a substrate processing apparatus which realizes a reduction in a maximum power consumption which is needed at turn-on for adjustment of a temperature.

Still other object of the present invention is to provide a substrate processing apparatus which realizes a reduction in a maximum power consumption which is needed for adjustment of a temperature when a target temperature is changed.

These and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
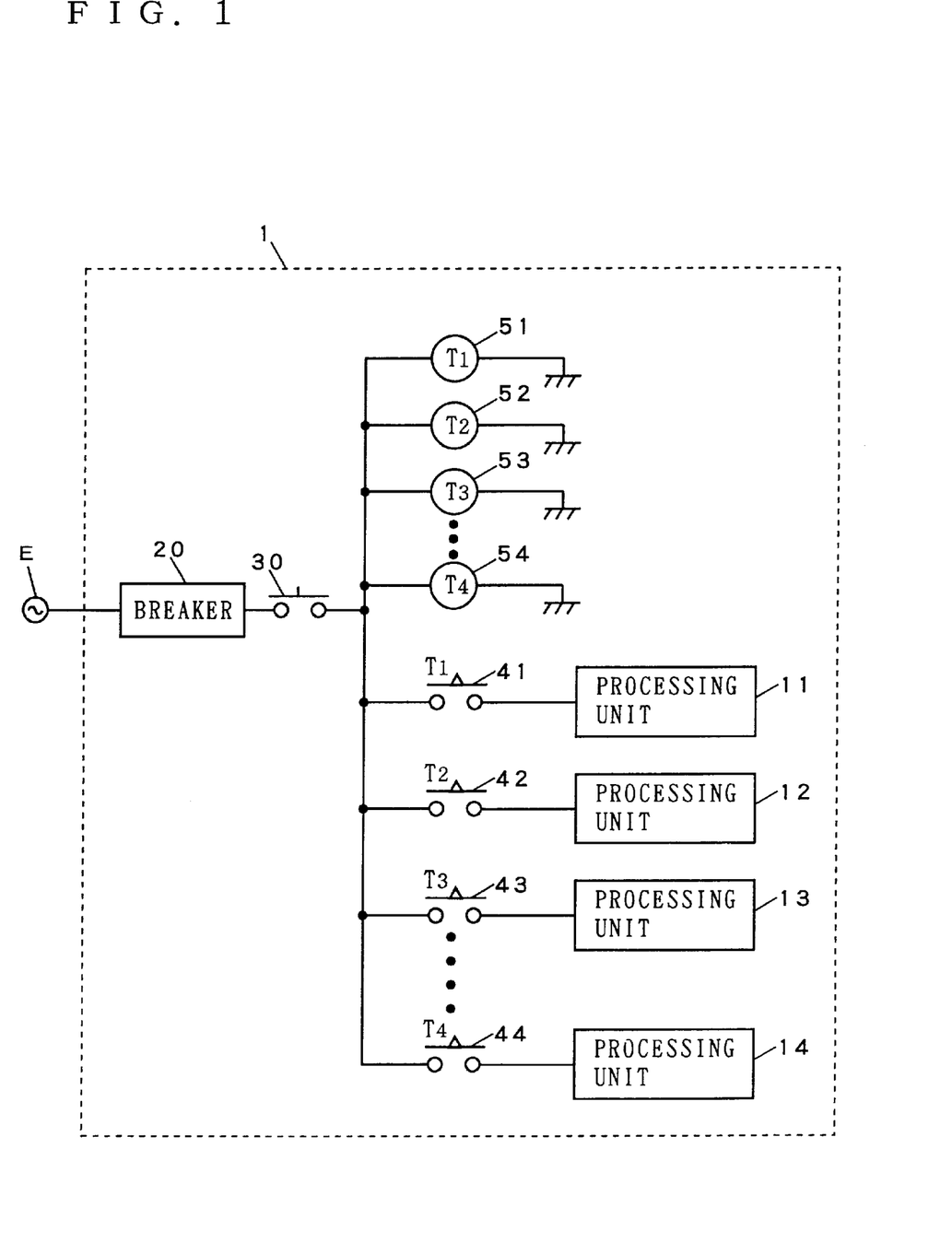
FIG. 1 is a block diagram showing an electric power system in a substrate processing apparatus according to a first preferred embodiment of the present invention.

FIG. 1 is a block diagram showing an electric power system in a substrate processing apparatus according to a first preferred embodiment of the present invention.

The substrate processing apparatus 1 which is shown in FIG. 1 comprises a plurality of processing units 11, 12, 13 and 14. The processing units 11, 12, 13 and 14 are a spin type coating unit for applying a coating liquid such as a resist to a substrate, a developing unit for developing a substrate, a cleaning unit for cleaning a substrate, a heating unit for heating a substrate, a cooling unit for cooling a substrate, a transport unit for transporting a substrate, etc., for instance.

Such a substrate processing unit 1 comprises a breaker 20, a turn-on switch 30, a plurality of switches 41, 42, 43 and 44, and a plurality of timers 51, 52, 53 and 54. The plurality of switches 41, 42, 43 and 44 and the plurality of timers 51, 52, 53 and 54 are disposed to correspond to the plurality of processing units 11, 12, 13 and 14, respectively.

Power receiving parts of the plurality of processing units 11, 12, 13 and 14 are connected to one end of the turn-on switch 30 respectively through the associated switches 41, 42, 43 and 44. In a similar manner, the plurality of timers 51, 52, 53 and 54 are connected to the one end of the turn-on switch 30. The other end of the turn-on switch 30 is connected to an external power source F through the breaker 20.

Timer values $T_1$, $T_2$, $T_3$ and $T_4$ are set in advance in the timers 51, 52, 53 and 54, respectively. When the turn-on switch 30 is turned on, the timers 51 to 54 operate, turning on the associated switches 41 to 44 respectively after times which are defined by the timer values $T_1$ to $T_4$. For example, when the timer values $T_1$ to $T_4$ for the timers 51 to 54 are set to satisfy $T_1<T_2<T_3<T_4$, after turning on of the turn-on switch 30, the switch 41, the switch 42, the switch 43 and the switch 44 turn on in this order, each with a delay of a certain time. This allows electric power to be supplied to the plurality of processing units 11 to 14 at different times.

In the first preferred embodiment, the processing units 11 to 14 correspond to processing portions, and the turn-on switch 30 corresponds to turn-on means. The switches 41 to 44 correspond to switch means, and the timers 51 to 54 correspond to timing means. The switches 41 to 44 and the timers 51 to 54 form power supply controlling means.

Figure 2:
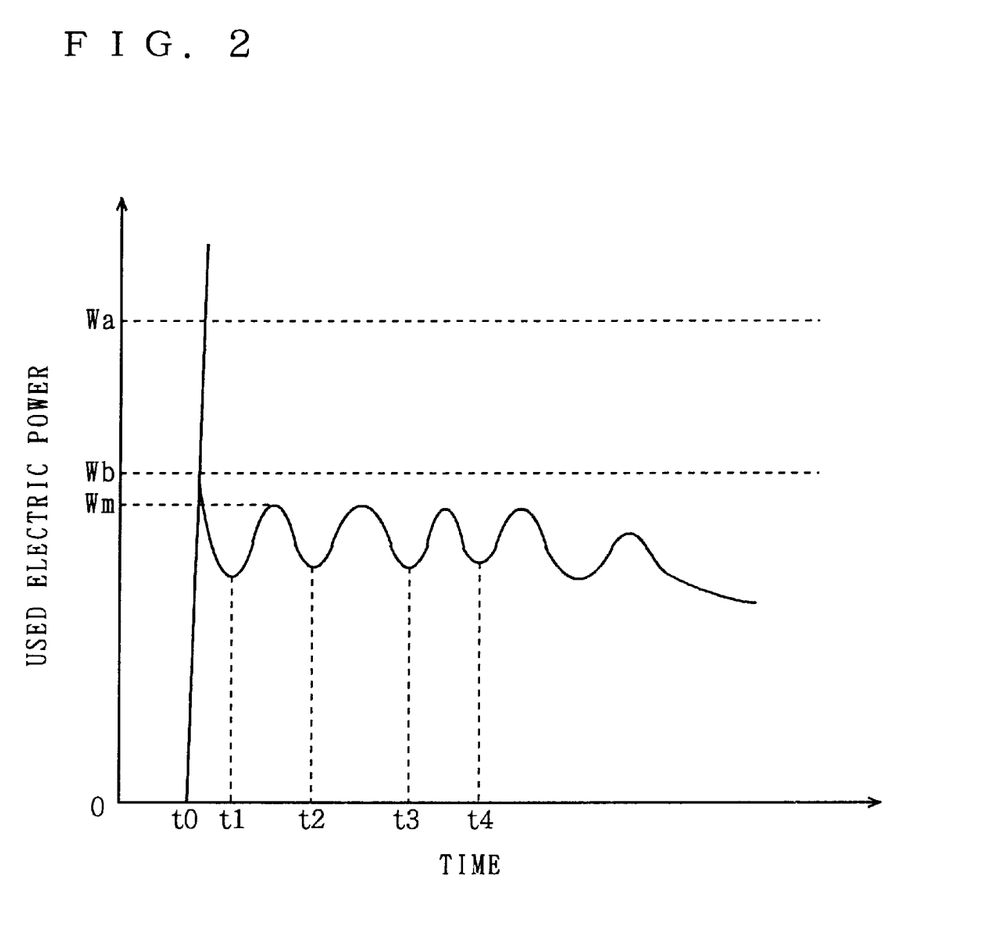
FIG. 2 is a view showing a change with time in electric power which is used by the substrate processing apparatus of FIG. 1 as a whole.

FIG. 2 is a view showing a change with time in used electric power which is used by the substrate processing apparatus 1 of FIG. 1 as a whole. In the example above, when the turn-on switch 30 is turned on at a time t0, the switch 41 turns on at a time t1, the switch 42 turns on at a time t2, the switch 43 turns on at a time t3, and the switch 44 turns on at a time t4.

Thus, since the switches 41 to 44 which respectively correspond to the plurality of processing units 11 to 14 turn on at different times immediately after turn-on, initial consumptions of electric power at the processing units 11 to 14 occur at different times. This reduces a maximum value Wm of electric power which is used by the substrate processing apparatus 1 as a whole immediately after the turn-on.

A working power Wb of the breaker 20 is set higher than the maximum value Wm of the used electric power immediately after turn-on. This makes it possible to reduce the working power Wb of the breaker 20 more greatly than the working power Wa of the breaker 20 of the conventional substrate processing apparatus 1a. Hence, it is possible to largely reduce a power supplying capability of the external power source E.

Further, by adjusting the timer values $T_1$ to $T_4$ for the timers 51 to 54, it is possible to optionally set times at which electric power is supplied to the respective processing units 11 to 14 upon turn-on. Hence, it is possible to easily set times at which and an order in which electric power is supplied to the respective processing units 11 to 14 while reducing the maximum value Wm of electric power which is used by the substrate processing apparatus 1 as a whole, in accordance with a maximum power consumption at the processing units 11 to 14.

The timer values $T_1$ to $T_4$ for the timers 51 to 54 may be manually set by an operator, or automatically set by a control part such as a CPU (Central Processing Unit).

Figure 3:
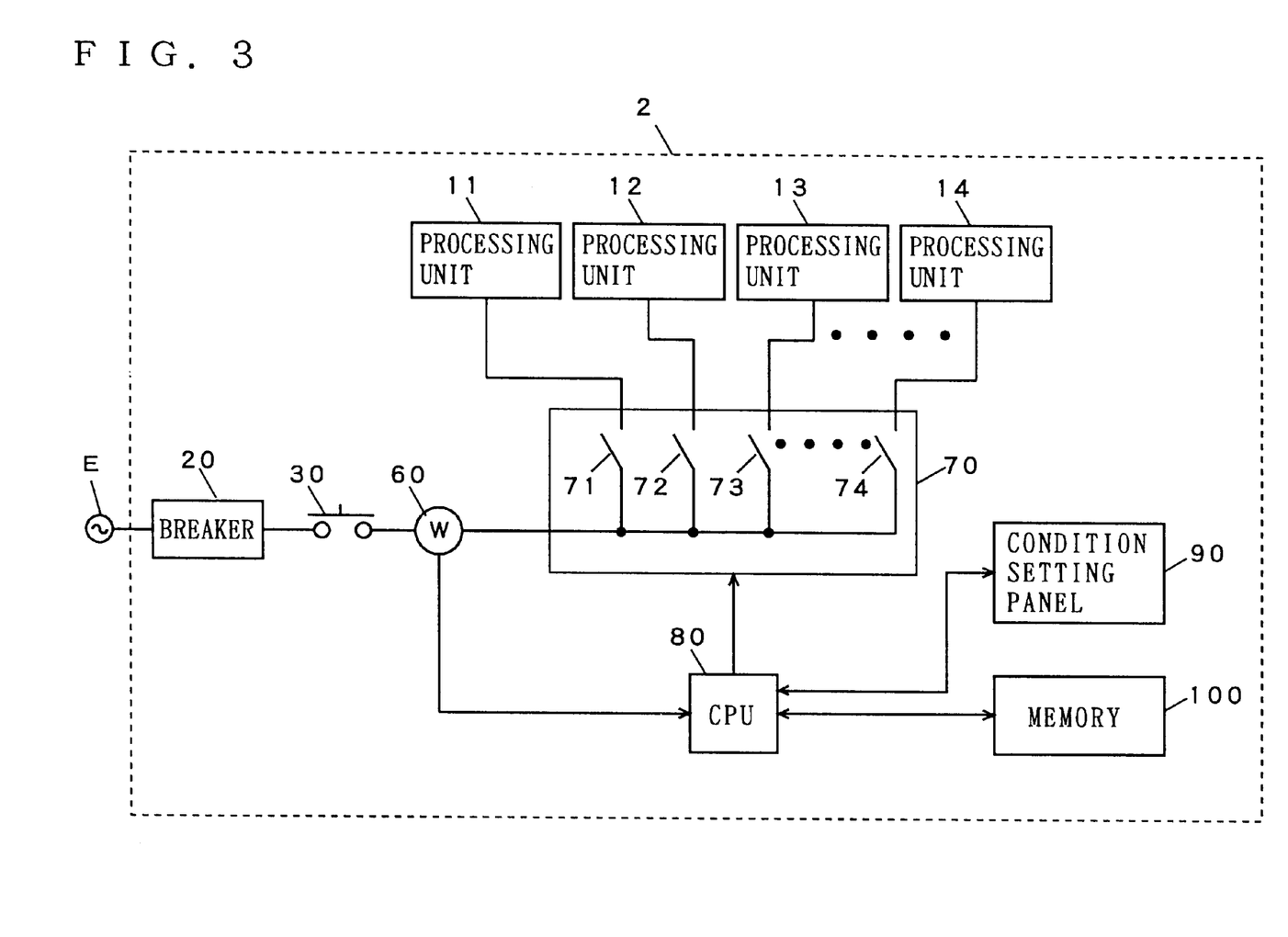
FIG. 3 is a block diagram showing an electric power system in a substrate processing apparatus according to a second preferred embodiment of the present invention.

FIG. 3 is a block diagram showing an electric power system in a substrate processing apparatus according to a second preferred embodiment of the present invention.

In FIG. 3, the substrate processing apparatus 2 comprises a plurality of processing units 11, 12, 13 and 14. The substrate processing apparatus 2 also comprises a breaker 20, a turn-on switch 30, a power meter 60, a switch part 70, a CPU (Central Processing Unit) 80, a condition setting panel 90, and a memory 100. The switch part 70 comprises a plurality of switches 71, 72, 73 and 74 which correspond to the plurality of processing units 11, 12, 13 and 14, respectively.

Power receiving parts of the plurality of processing units 11 to 14 are connected to one end of the turn-on switch 30, respectively through the associated switches 71 to 74 of the switch part 70 and through the power meter 60. The other end of the turn-on switch 30 is connected to an external power source E through the breaker 20.

The power meter 60 measures electric power which is used by the substrate processing apparatus 2 as a whole. The condition setting panel 90 is used to set conditions, such as a power supplying order in which electric power is supplied to the plurality of processing units 11 to 14, a maximum power consumption at the processing units 11 to 14, preset electric power of the processing units 11 to 14, maximum allowable power of the processing units 11 to 14.

The conditions which are set through the condition setting panel 90 are stored in the memory 100 through the CPU 80. The CPU 80 turns on the switches 71 to 74 of the switch part 70 respectively at predetermined times, based on used electric power which is measured by the power meter 60 and various data which are supplied from the memory 100.

In the second preferred embodiment, the switches 71 to 74 correspond to switch means, the power meter 60 corresponds to power measuring means, and the CPU 80 corresponds to switch controlling means. The power meter 60, the switches 71 to 74, and the CPU 80 form power supply controlling means.

Next, an operation of the substrate processing apparatus 2 of FIG. 3 will be described with reference to FIGS. 4 to 7.

Figure 4:
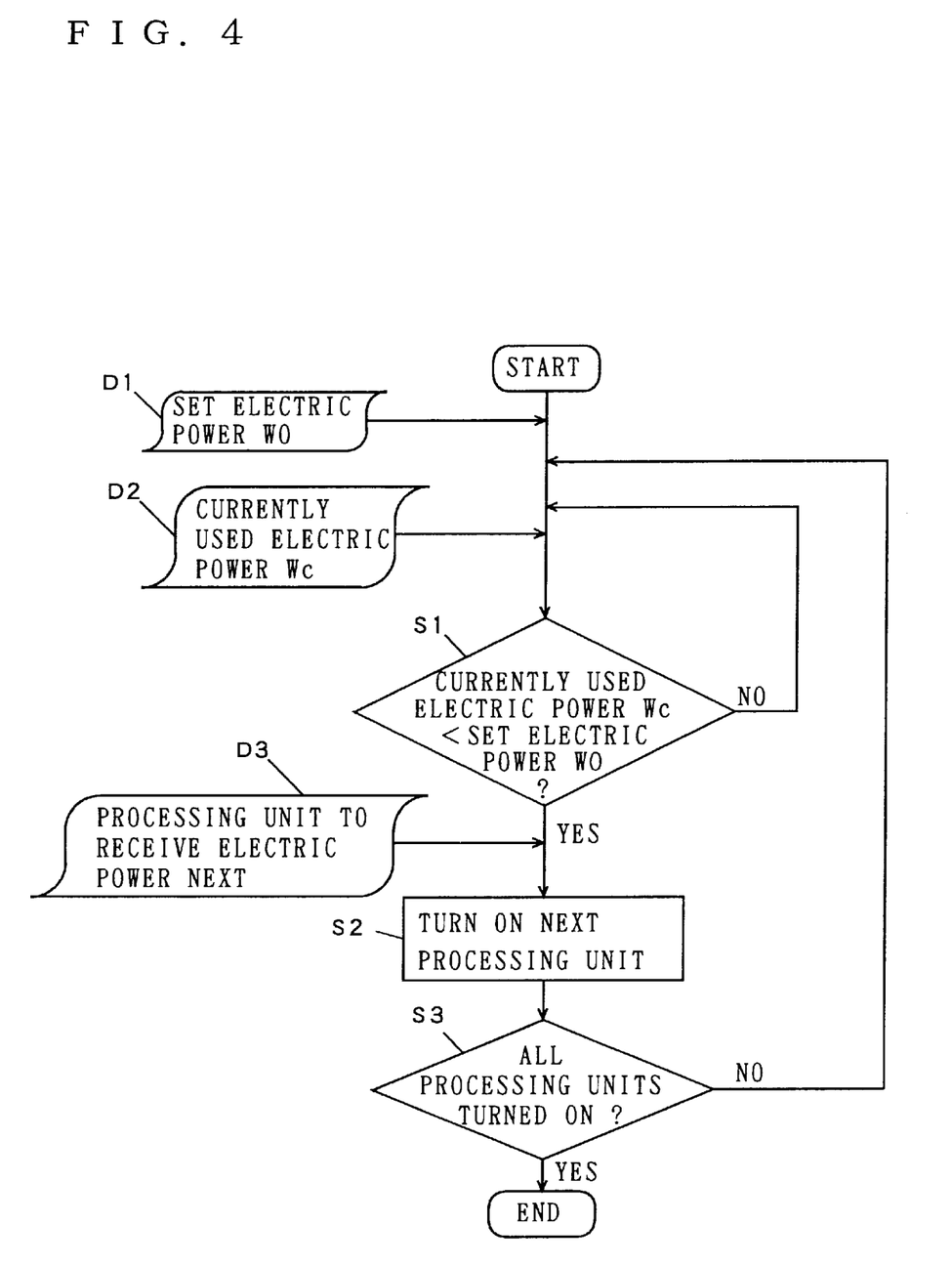
FIG. 4 is a flow chart showing an example of processing which is performed by a CPU in the substrate processing apparatus of FIG. 3.
Figure 5:
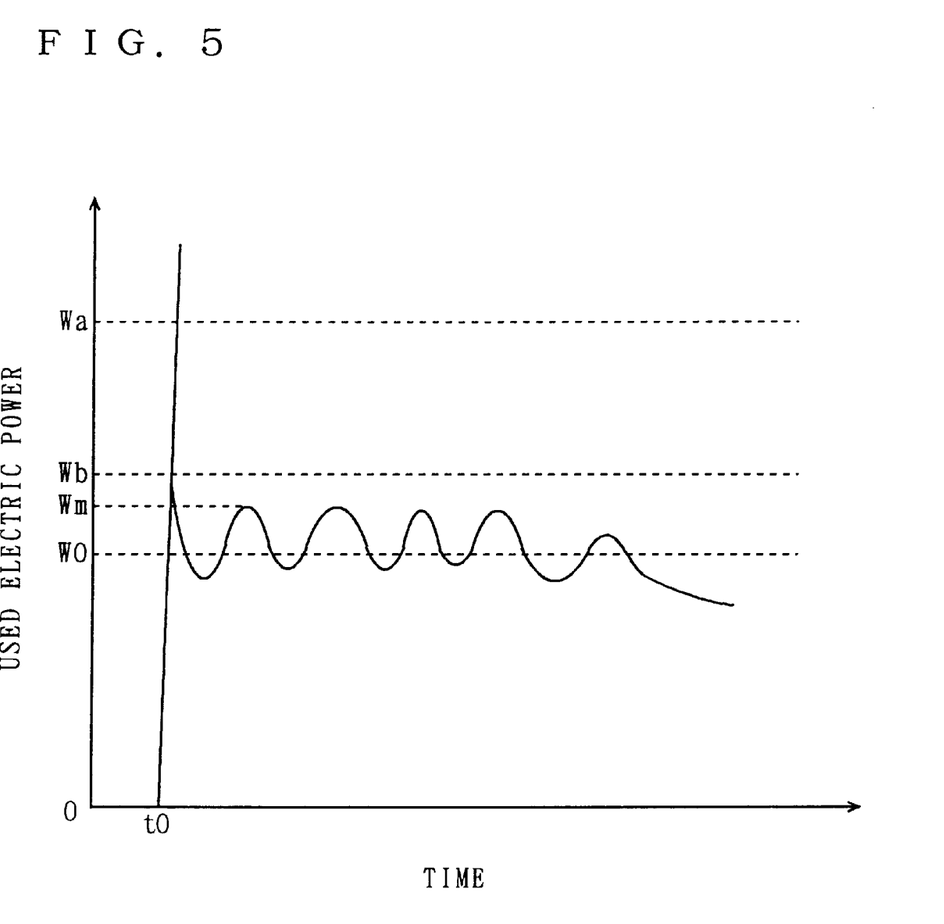
FIG. 5 is a view showing a change with time in electric power which is used by the substrate processing apparatus as a whole during the processing which is shown in FIG. 4.

FIG. 4 is a flow chart showing an example of processing which is performed by the CPU 80 in the substrate processing apparatus 2 of FIG. 3. FIG. 5 is a view showing a change with time in used electric power which is used by the substrate processing apparatus 2 as a whole during the processing which is shown in FIG. 4.

This example assumes that preset electric power W0 and the a power supplying order in which electric power is supplied to the processing units 11 to 14 are stored in the memory 100 in advance through the condition setting panel 90. The preset electric power W0 corresponds to a reference level.

As the turn-on switch 30 is turned on, the CPU 80 reads data D1 regarding the preset electric power W0 from the memory 100. The CPU 80 thereafter reads data D2 regarding currently used electric power Wc from the power meter 60, and determines if the currently used electric power Wc is lower than the preset electric power W0 (step S1).

If the currently used electric power Wc is equal to or higher than the preset electric power W0, the CPU 80 waits. As the currently used electric power Wc becomes lower than the preset electric power W0, the CPU 80 reads data D3 regarding the processing unit which is to be provided with electric power next from the memory 100 and turns on the switch which corresponds to the processing unit (step S2).

Following this, the CPU 80 determines if the switches which correspond to all of the processing units are turned on (step S3). If the switches which correspond to all of the processing units are not turned on, the CPU 80 reads the data D2 regarding the currently used electric power Wc from the power meter 60, and returns to the step S1. The CPU 80 repeats the processes at the steps S1 to S3 until the switches which correspond to all processing units are turned on. When the switches which correspond to all of the processing units are turned on, the CPU 80 ends the processing.

In the example shown in FIG. 4, as shown in FIG. 5, at turning on of the turn-on switch 30 at the time t0, the switches are not turned on if the currently used electric power Wc is higher than the preset electric power W0, but the next switch is turned on when the currently used electric power Wc becomes lower than the preset electric power W0. In this manner, the plurality of switches 71 to 74 are turned on in the predetermined order each with a delay.

As described above, since the switches 71 to 74 which respectively correspond to the plurality of processing units 11 to 14 are turned on at different times immediately after turn-on, initial consumptions of electric power at the processing units 11 to 14 occur at different times. This reduces the maximum value Wm of electric power which is used by the substrate processing apparatus 2 as a whole immediately after the turn-on.

The working power Wb of the breaker 20 is set higher than the maximum value Wm of the used electric power immediately after turn-on. This makes it possible to reduce the working power Wb of the breaker 20 more greatly than the working power Wa of the breaker 20 of the conventional substrate processing apparatus 1a. Hence, it is possible to largely reduce a power supplying capability of the external power source E.

In the example above, by optionally setting the preset electric power W0 and the power supplying order for supplying electric power to the processing units 11 to 14, it is possible to reduce the maximum value Wm of used electric power immediately after turn-on.

Figure 6:
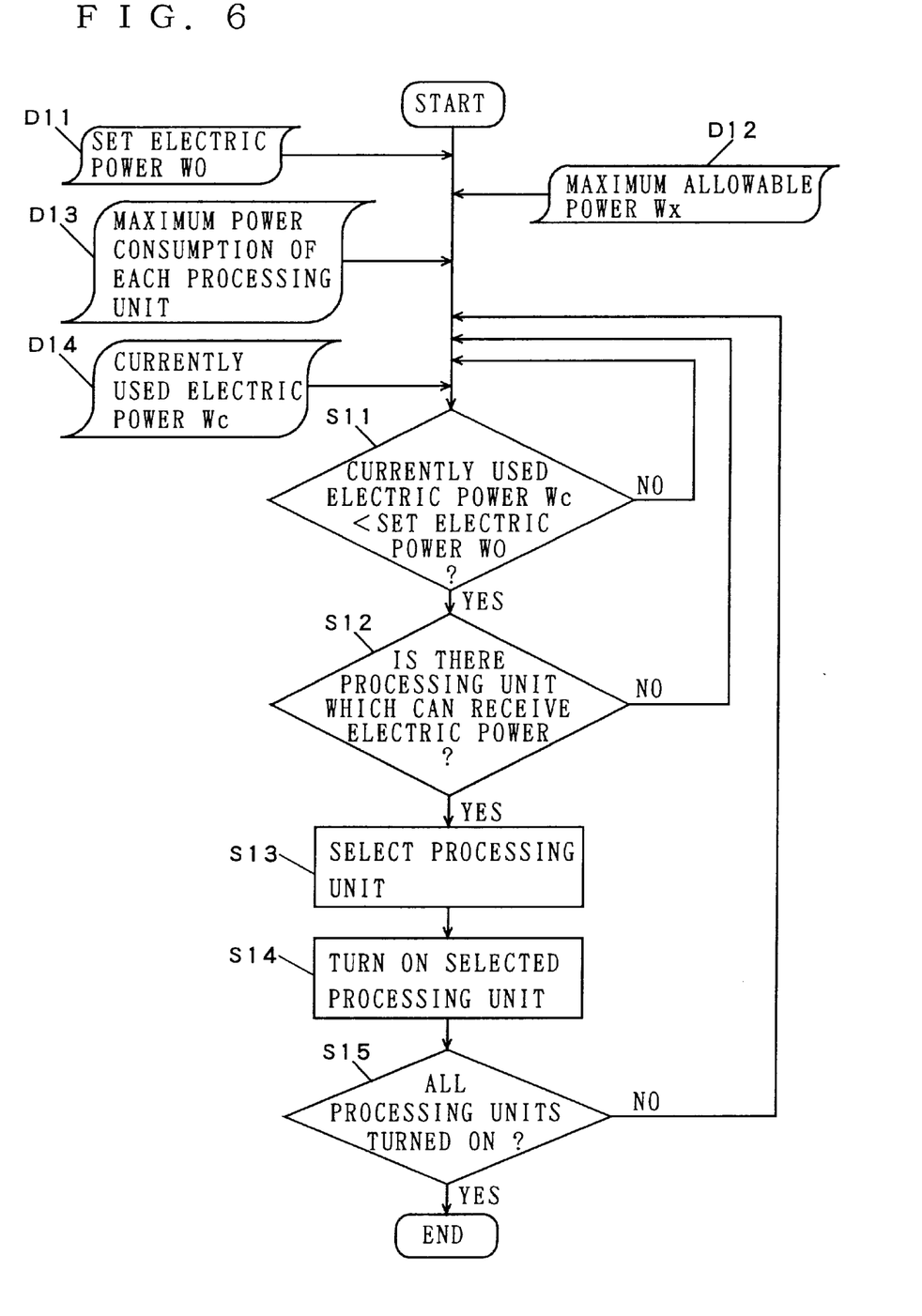
FIG. 6 is a flow chart showing other example of the processing which is performed by the CPU in the substrate processing apparatus of FIG. 3.
Figure 7:
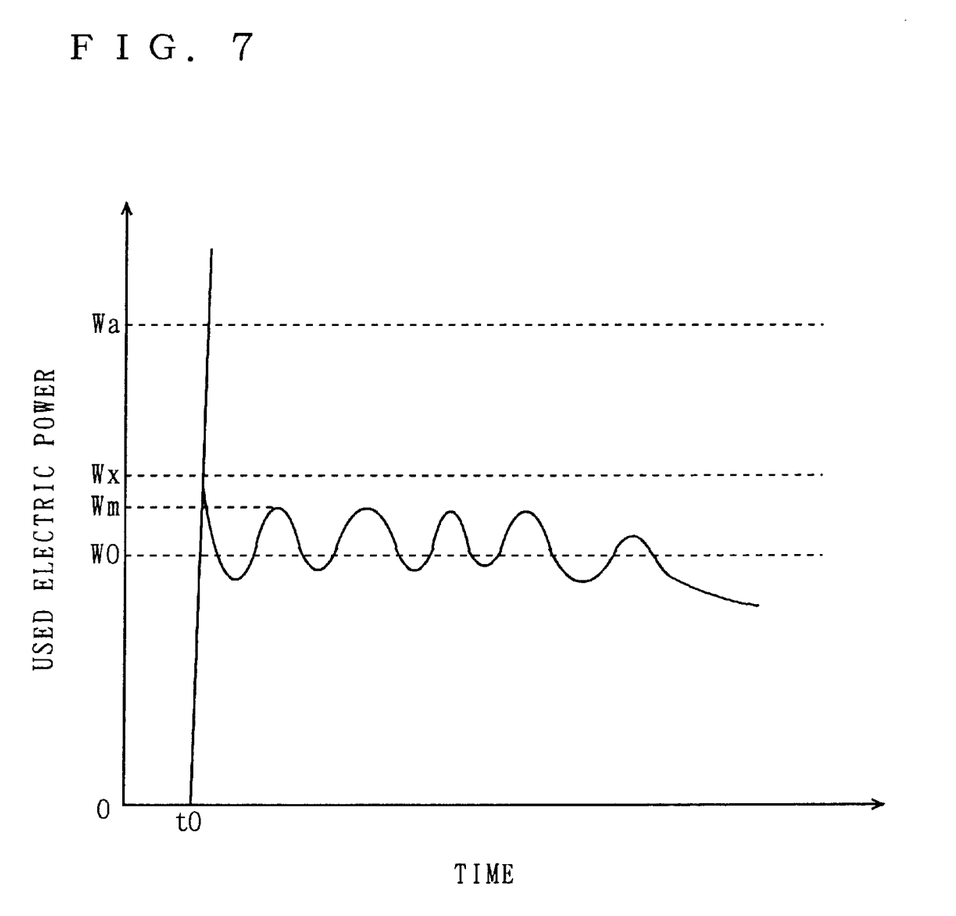
FIG. 7 is a view showing a change with time in electric power which is used by the substrate processing apparatus as a whole during the operation which is shown in FIG. 6.

FIG. 6 is a flow chart showing other example of the processing which is performed by the CPU 80 in the substrate processing apparatus 2 of FIG. 3. FIG. 7 is a view showing a change with time in used electric power which is used by the substrate processing apparatus 2 as a whole during the operation which is shown in FIG. 6.

This example assumes that the preset electric power W0, maximum allowable power Wx and, a maximum power consumption at the processing units 11 to 14 are stored in the memory 100 in advance through the condition setting panel 90. The preset electric power W0 corresponds to a reference level, and the maximum allowable power Wx corresponds to a maximum allowable level.

As the turn-on switch 30 is turned on, the CPU 80 reads data D11 regarding the preset electric power W0, data D12 regarding, the maximum allowable power Wx, and data D13 regarding the maximum power consumption at the processing units 11 to 14, each from the memory 100. The CPU 80 thereafter reads data D14 regarding the currently used electric power Wc from the power meter 60, and determines if the currently used electric power Wc is lower than the preset electric power W0 (step S11).

If the currently used electric power Wc is equal to or higher than the preset electric power W0, the CPU 80 waits. As the currently used electric power Wc becomes lower than the preset electric power W0, the CPU 80 determines if there is a processing unit to which it is possible to supply electric power (step S12). In this case, the CPU 80 calculates a difference between the maximum allowable power Wx and the currently used electric power Wc. The CPU 80 then determines if there is a processing unit whose maximum power consumption is lower than the calculated difference, in accordance with the data D13 regarding the maximum power consumption at the processing units 11 to 14.

If there is no processing unit to which it is possible to supply electric power, the CPU 80 reads the data D14 regarding the currently used electric power Wc from the power meter 60, and returns to the step S11. If there are processing units which can receive electric power, the CPU 80 selects one of those processing units in accordance with a predetermined priority order (step S13), and turns on the switch which corresponds to the selected processing unit (step S14).

Following this, the CPU 80 determines if the switches which correspond to all of the processing units are turned on (step S15). The CPU 80 repeats the processes at the steps S11 to S15 until the switches which correspond to all processing units are turned on. When the switches which correspond to all of the processing units are turned on, the CPU 80 ends the processing.

In the example shown in FIG. 6, as shown in FIG. 7, at turning on of the turn-on switch 30 at the time to, the CPU 80 selects the processing unit whose maximum power consumption is lower than the difference between the maximum allowable power Wx and the currently used electric power Wc if the currently used electric power Wc is lower than the preset electric power W0, and allows supply of electric power to the selected processing unit. This allows that the maximum value Wm of electric power which is used by the substrate processing apparatus 2 as a whole immediately after the turn-on is suppressed to the maximum allowable power Wx or lower.

An working power of the breaker 20 is set equal to or higher than the maximum allowable power Wx. This makes it possible to reduce the working power of the breaker 20 more greatly than the working power Wa of the breaker 20 of the conventional substrate processing apparatus 1*a*. Hence, it is possible to largely reduce a power supplying capability of the external power source E.

In the example described above, as the preset electric power W0 and the maximum allowable power Wx are set, the power supplying order in which and the times at which electric power is supplied to the processing units 11 to 14 are automatically set in such a manner that the maximum value Wm of electric power which is used by the substrate processing apparatus 2 as a whole is equal to or lower than the maximum allowable power Wx.

Figure 8:
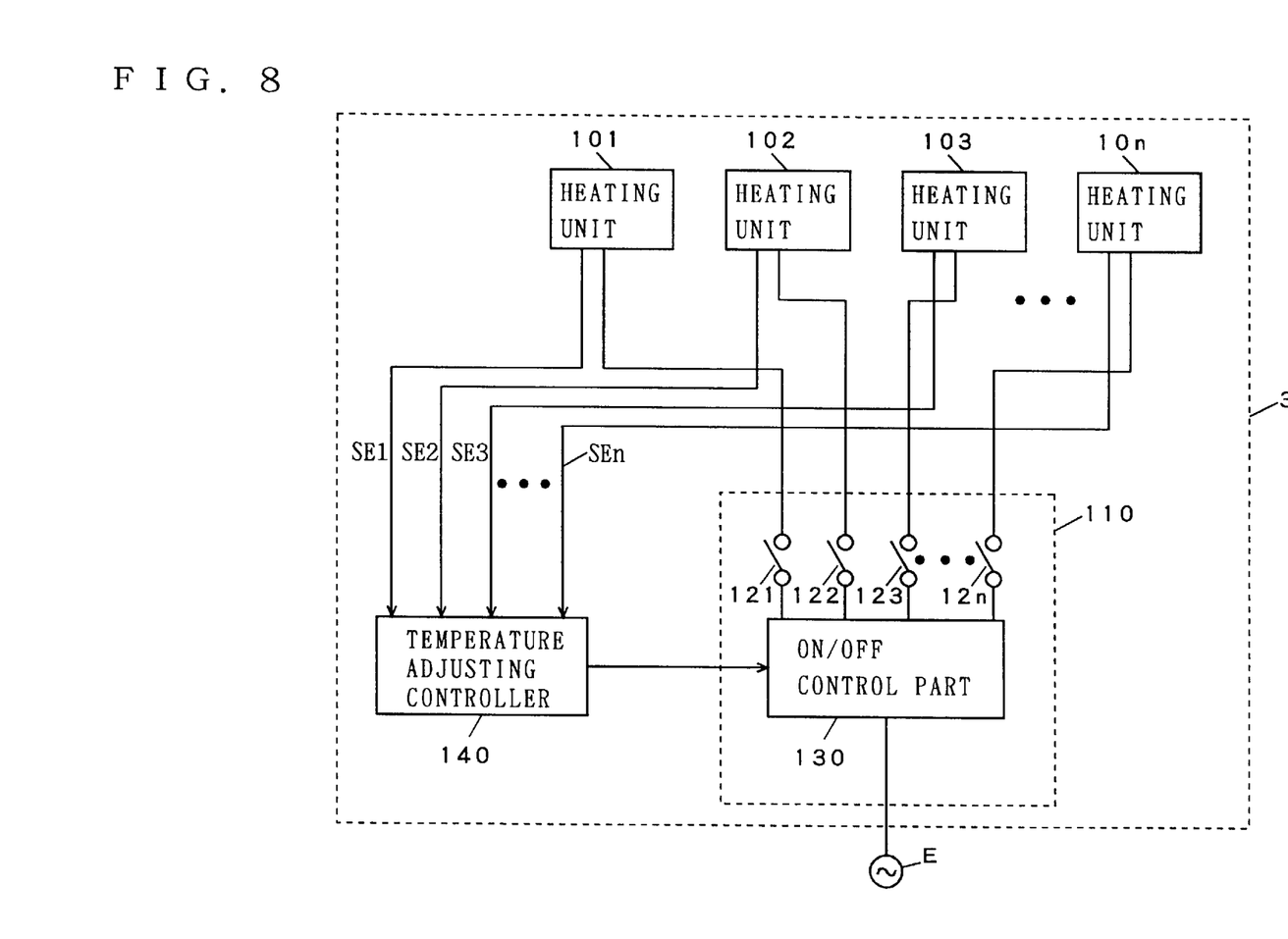
FIG. 8 is a block diagram showing an electric power system in a substrate processing apparatus according to a third preferred embodiment of the present invention.

FIG. 8 is a block diagram showing an electric power system in a substrate processing apparatus according to a third preferred embodiment of the present invention.

The substrate processing apparatus 3 shown in FIG. 8 comprises a plurality of heating units (hot plates) 101, 1012, . . . , 10*n*, a heater controller 110, and a temperature adjusting controller 140. The heater controller 110 comprises a plurality of switches 121, 122, . . . , 12*n*, and an ON/OFF control part 130. The plurality of switches 121 to 12*n* are disposed to correspond to the plurality of heating units 101 to 10*n*, respectively.

The heating units 101 to 10*n* each comprise a substrate supporting plate for supporting a substrate and a heater which serves as a heat source which heats up the substrate supporting plate.

Power receiving parts which are connected to the heaters of the plurality of heating units 101 to 10*n* are connected to the ON/OFF control part 130, respectively through the associated switches 121 to 12*n*. The ON/OFF control part 130 is connected to an external power source E. The ON/OFF control part 130 controls turning on and off of each one of the plurality of switches 121 to 12*n*. This allows a current to be continuously or intermittently supplied to the heaters of the heating units 101 to 10*n*, whereby the substrate supporting plates are heated.

The substrate supporting plates of the plurality of heating units 101 to 10*n* each comprise a temperature sensor. Output signals SE1 to SEn from the temperature sensors of the heating units 101 to 10*n* are supplied to the temperature adjusting controller 140. Processing temperatures at the respective heating units 101 to 10*n* are set as target temperatures in the temperature adjusting controller 140.

The temperature adjusting controller 140 provides the ON/OFF control part 130 with a control signal which instructs to turn on or off the plurality of switches 121 to 12*n*, in accordance with the target temperatures which are set for the respective heating units 101 to 10*n*. The ON/OFF control part 130 turns on or off the respective switches 121 to 12*n*, in response to the control signal which is received from the temperature adjusting controller 140.

In the third preferred embodiment, the heating units 101 to 10*n* correspond to processing portions, the heater controller 10 corresponds to power supplying means, and the temperature adjusting controller 140 corresponds to power supply controlling means.

Now, an operation of the substrate processing apparatus 3 of FIG. 8 will be described. It is assumed again that a power consumption of the heaters of the heating units 101 to 10*n* is 100 W, and that the target temperatures for the heating units 101, 102, 103 and 10*n* which are set in the temperature adjusting controller 140 in an initial state are respectively 150° C., 200° C., 120° C. and 100° C., for example.

In accordance with the output signals SE1 to SEn from the temperature sensors of the heating units 101 to 10*n*, the temperature adjusting controller 140 detects the temperatures of the substrate supporting plates of the respective heating units 101 to 10*n*.

At turn-on, first, the temperature adjusting controller 140 turns on the switch 121 which is connected to the heating unit 101, under the control of the ON/OFF control part 130. This allows a current to the heater of the heating unit 101, so that the substrate supporting plate of the heating unit 101 is heated. At this stage, electric power which is consumed by the heating unit 101 is 100 W.

As the temperature of the substrate supporting plate of the heating unit 101 reaches the target temperature, the temperature adjusting controller 140 turns on the switch 122 which is connected to the heating unit 102, under the control of the ON/OFF control part 130. At the same time, the temperature adjusting controller 140 turns on or off the switch 121 under the control of the ON/OFF control part 130, to thereby keep the temperature of the substrate supporting plate of the heating unit 101 at the target temperature. In this case, the current which is supplied to the heater of the heating unit 101 is on/off controlled in accordance with a change in the temperature of the substrate supporting plate of the heating unit 101.

Following this, in a similar manner, the temperature adjusting controller 140 sequentially turns on the switches 123 to 12*n* which are connected to the heating units 103 to 10 *n* under the control of the ON/OFF control part 130, while turning on or off the switches 123 to 12*n* under the control of the ON/OFF control part 130 for the purpose of keeping the temperature after the temperatures of the substrate supporting plates of the heating units 103 to 10*n* reach the respective target temperatures.

When a recipe (i.e., procedure) is changed in response to a change in a lot which contains a substrate which is to be processed, the target temperatures for the heating units 101 to 10*n* which are set in the temperature adjusting controller 140 are also changed.

In this case, the temperature adjusting controller 140 adjusts the temperatures of the heating units 101 to 10*n* at shifted times in accordance with the changed target temperatures. For example, the temperature adjusting controller 140 supplies a current to the heater of the heating unit 101 under the control of the ON/OFF control part 130, first, to thereby adjust the temperature of the substrate supporting plate of the heating unit 101 to the changed target temperature.

After completing the adjustment of the temperature of the heating unit 101, the temperature adjusting controller 140 supplies a current to the heater of the heating unit 102 under the control of the ON/OFF control part 130, to thereby adjust the temperature of the substrate supporting plate of the heating unit 102 to the changed target temperature.

In a similar manner, after completing the adjustment of the temperature of the heating unit 102, the temperature adjusting controller 140 adjusts the temperatures of the substrate supporting plates of the heating units 103 to 10n at shifted times to the changed target temperatures.

As described above, in the substrate processing apparatus 3 according to the third preferred embodiment, electric power for adjustment of the temperatures is sequentially supplied to the heating units 101 to 10n at shifted times at turn-on, and therefore, the maximum power consumption is $(100+\alpha)$ W. The symbol $\alpha$ denotes electric power which is necessary for heat retaining after the adjustment of the temperatures is completed, and this electric power is sufficiently smaller than the electric power which is necessary for the adjustment of the temperatures.

On the other hand, in the conventional substrate processing apparatus, since all heating units are provided with electric power simultaneously at turn-on, the maximum power consumption is $(100\times n)$ W. The symbol n denotes the number of the heating units.

Further, in the substrate processing apparatus 3 according to the third preferred embodiment, when the target temperatures are changed, the temperatures of the substrate supporting plates of the heating units 101 to 10n are adjusted at shifted times to the changed target temperatures. This reduces the maximum power consumption immediately after the target temperatures are changed.

Hence, it is possible to reduce a power supplying capability of the external power source E, while reducing capacities of wire material parts of the electric power system. This makes energy conservation and cost reduction possible.

Although the third preferred embodiment requires a longer time until the adjustment of the temperatures of the heating units 101 to 10n is completed, since the adjustment of the temperatures is necessary only on limited occasions of turn-on and a change in the target temperatures, the extension in the time which is needed for the adjustment of the temperatures is very short as compared with total operating hours of the substrate processing apparatus 3.

For reduction in the maximum power consumption, it is preferable to start adjusting the temperature of the next heating unit every time adjustment of the temperature of each heating unit is completed as in the third preferred embodiment. However, adjustment of the temperature of the next heating unit may be started before adjustment of the temperature of each heating unit is completed. Even in such a case, since the temperatures of a smaller number of the heating units are adjusted at the same time as starting times for adjusting the temperatures of the respective heating units are shifted, the maximum power consumption can be reduced than in the conventional substrate processing apparatus.

While the invention has been described in detail, the foregoing description is in all aspects illustrative and not restrictive. It is understood that numerous other modifications and variations can be devised without departing from the scope of the invention.

We claim:

1. An apparatus for processing a substrate, comprising:
   a) a plurality of processing portions each for applying predetermined processing to a substrate;
   b) turn-on means which is connected to an external power source which is disposed outside said apparatus; and
   c) power supply controlling means for providing each one of said plurality of processing portions with electric power which is supplied from said external power source through said turn-on means, said power supply controlling means comprising:
      c-3) a plurality of switch means each connected between said turn-on means and each one of said plurality of processing portions;
      c-4) power measuring means for measuring total electric power which is being used at said plurality of processing portions; and
      c-5) switch controlling means for sequentially turning on said plurality of switch means in accordance with a measurement which is obtained by said power measuring means, said switch controlling means selecting an objective processing portion from said plurality of processing portions in accordance with a difference between a maximum allowable level which is set in advance and said measurement, and turns on one of said switch means which corresponds to said objective processing portion which is selected from said plurality of processing portions,
   wherein at turn-on by said turn-on means, said power supply controlling means sequentially provides said plurality of processing portions with said electric power using time intervals.

2. The apparatus of claim 1, wherein said switch controlling means selects said objective processing portion from a group of said processing portions whose maximum power consumption is smaller than said difference between said maximum allowable level and said measurement, in a predetermined priority order.

3. An apparatus for processing a substrate, comprising:
   a) a plurality of processing portions each for applying predetermined processing to a substrate;
   b) turn-on means which is connected to an external power source which is disposed outside said apparatus; and
   c) power supply controlling means for providing each one of said plurality of processing portions with electric power which is supplied from said external power source through said turn-on means, said power supply controlling means comprising:
      c-3) a plurality of switch means each connected between said turn-on means and each one of said plurality of processing portions;
      c-4) power measuring means for measuring total electric power which is being used at said plurality of processing portions; and
      c-5) switch controlling means for sequentially turning on said plurality of switch means in accordance with a measurement which is obtained by said power measuring means, said switch controlling means sequentially delaying times at which said plurality of switch means are turned on in such a manner that said measurement does not exceed said maximum allowable level which is set in advance,
   wherein at turn-on by said turn-on means, said power supply controlling means sequentially provides said plurality of processing portions with said electric power using time intervals.

4. An apparatus for processing a substrate, comprising:
   a) a plurality of processing portions each comprising a heat source and each applying heat processing to a substrate;
   b) power supplying means which is connected to an external power source which is disposed outside said apparatus, said power supplying means providing each one of said plurality of processing portions with electric power which is supplied from said external power source; and c) power supply controlling means for controlling said power supplying means and thereby adjusting supply of said electric power to each one of said plurality of processing portions so that said plurality of processing portions reach predetermined target temperatures, wherein said power supply controlling means controls said power supplying means when said target temperatures are changed, in such a manner that said electric power from said external power source is sequentially supplied to each one of said plurality of processing portions with time intervals in accordance with changed target temperatures which are changed for said plurality of processing portions.

5. The apparatus of claim 4, wherein said power supply controlling means controls said power supplying means at turn-on, in such a manner that said electric power from said external power source is sequentially supplied to each one of said plurality of processing portions with time intervals.

6. A method of processing a substrate, comprising the steps of:

a) supplying electric power to a substrate processing apparatus from an external power source which is disposed outside said substrate processing apparatus; and b) sequentially supplying said electric power to a plurality of processing portions which are disposed within said substrate processing apparatus using time intervals at turn-on by said external power source, said sequentially supplying step including the steps of:

b-2) measuring total electric power which is being used at said plurality of processing portions to thereby obtain a measurement; and b-3) starting to sequentially supply said electric power to said plurality of processing portions in accordance with said measurement, said starting to sequentially supply said electric power step comprising:

b-3-1) selecting an objective processing portion from said plurality of processing portions in accordance with a difference between a maximum allowable level which is set in advance and said measurement; and b-3-2) starting to supply said electric power to said objective processing portion.

7. The method of claim 6, wherein said step b-3-1) comprises a step of selecting said objective processing portion from a group of said processing portions whose maximum power consumption is smaller than said difference between said maximum allowable level and said measurement, in a predetermined priority order.

8. A method of processing a substrate, comprising the steps of:

a) supplying electric power to each one of a plurality of processing portions of a substrate processing apparatus from an external power source which is disposed outside said substrate processing apparatus, said plurality of processing portions each comprising a heat source; and b) controlling supply of said electric power to said plurality of processing portions so that said plurality of processing portions reach predetermined target temperatures, wherein at said step b), supply of said electric power is controlled when said target temperatures are changed, in such a manner that said electric power from said external power source is sequentially supplied to each one of said plurality of processing portions with time intervals in accordance using changed target temperatures which are changed for said plurality of processing portions.

9. The method of claim 8, wherein said step b) comprises a step of controlling supply of said electric power at turn-on, in such a manner that said electric power from said external power source is sequentially supplied to each one of said plurality of processing portions with time intervals.

10. An apparatus for processing a substrate, comprising:

a) a plurality of processing portions each comprising a heat source and each applying heat processing to a substrate;

b) power supplying means which is connected to an external power source which is disposed outside said apparatus, said power supplying means providing each one of said plurality of processing portions with electric power which is supplied from said external power source; and c) power supply controlling means for controlling said power supplying means and thereby adjusting supply of said electric power to each one of said plurality of processing portions so that each one of said plurality of processing portions reaches a predetermined temperature, wherein said power supply controlling means controls said power supplying means at turn-on, in such a manner that said electric power from said external power source is sequentially supplied to each one of said plurality of processing portions using time intervals such that said electric power is supplied to a following processing portion when a temperature of a processing portion previously supplied with said electric power reaches said predetermined temperature.

11. An apparatus for processing a substrate, comprising:

a) a plurality of processing portions each comprising a heat source and each applying heat processing to a substrate;

b) power supplying means which is connected to an external power source which is disposed outside said apparatus, said power supplying means providing each one of said plurality of processing portions with electric power which is supplied from said external power source; and c) power supply controlling means for controlling said power supplying means and thereby adjusting supply of said electric power to each one of said plurality of processing portions so that said plurality of processing portions reach predetermined target temperatures, wherein said power supply controlling means controls said power supplying means when said target temperatures are changed in accordance with changed target temperatures which are changed for said plurality of processing portions, in such a manner that said electric power from said external power source is sequentially supplied to each one of said plurality of processing portions using time intervals such that said electric power is supplied to a following processing portion when a temperature of a processing portion previously supplied with said electric power reaches said changed target temperature.

* * * * *